United States Patent
Schmitt

(10) Patent No.: US 9,694,645 B2
(45) Date of Patent: Jul. 4, 2017

(54) TORSION SPRING BAR SYSTEM FOR A WHEEL SUSPENSION OF A MOTOR VEHICLE

(71) Applicant: AUDI AG, Ingolstadt (DE)

(72) Inventor: Joachim Schmitt, Ingolstadt (DE)

(73) Assignee: Audi AG, Ingolstadt (DE)

( * ) Notice: Subject to any disclaimer, the term of this patent is extended or adjusted under 35 U.S.C. 154(b) by 21 days.

(21) Appl. No.: 14/908,933

(22) PCT Filed: Jul. 10, 2014

(86) PCT No.: PCT/EP2014/001888
§ 371 (c)(1),
(2) Date: Jan. 29, 2016

(87) PCT Pub. No.: WO2015/014439
PCT Pub. Date: Feb. 5, 2015

(65) Prior Publication Data
US 2016/0185180 A1   Jun. 30, 2016

(30) Foreign Application Priority Data

Jul. 31, 2013   (DE) .................. 10 2013 012 755

(51) Int. Cl.
*B60G 21/05*    (2006.01)
*B60G 17/02*    (2006.01)
(Continued)

(52) U.S. Cl.
CPC ............ *B60G 17/025* (2013.01); *B60G 11/60* (2013.01); *B60G 21/05* (2013.01);
(Continued)

(58) Field of Classification Search
CPC ...... B60G 11/60; B60G 17/025; B60G 21/05; B60G 21/051; B60G 21/023;
(Continued)

(56) References Cited

U.S. PATENT DOCUMENTS 2,951,710 A  *  9/1960  Willetts ............... B60G 5/06
                                                   267/276
3,118,660 A  *  1/1964  Saniewski ........... B60G 17/025
                                                   267/154
(Continued)

FOREIGN PATENT DOCUMENTS

DE       2825176      12/1978
DE     195 08 611      9/1996
(Continued)

OTHER PUBLICATIONS

International Search Report issued by the European Patent Office in International Application PCT/EP2014/001888.

*Primary Examiner* — Barry Gooden, Jr.
(74) *Attorney, Agent, or Firm* — Henry M. Feiereisen, LLC

(57) ABSTRACT

A torsion spring bar system for a wheel suspension of a motor vehicle includes on each vehicle side a torsion spring bar which is oriented transversely to the vehicle longitudinal center and acts on each wheel guide element of the wheel suspension with variable pretension via an output lever positioned outwards with respect to the vehicle longitudinal center. The torsion spring bar is acted upon by an actuator with a torsional moment. The torsion spring bars on both vehicle sides are coupled to one another at their axially adjacent ends in the vehicle longitudinal center via at least one additional torsion spring element.

8 Claims, 3 Drawing Sheets

Figure 5:
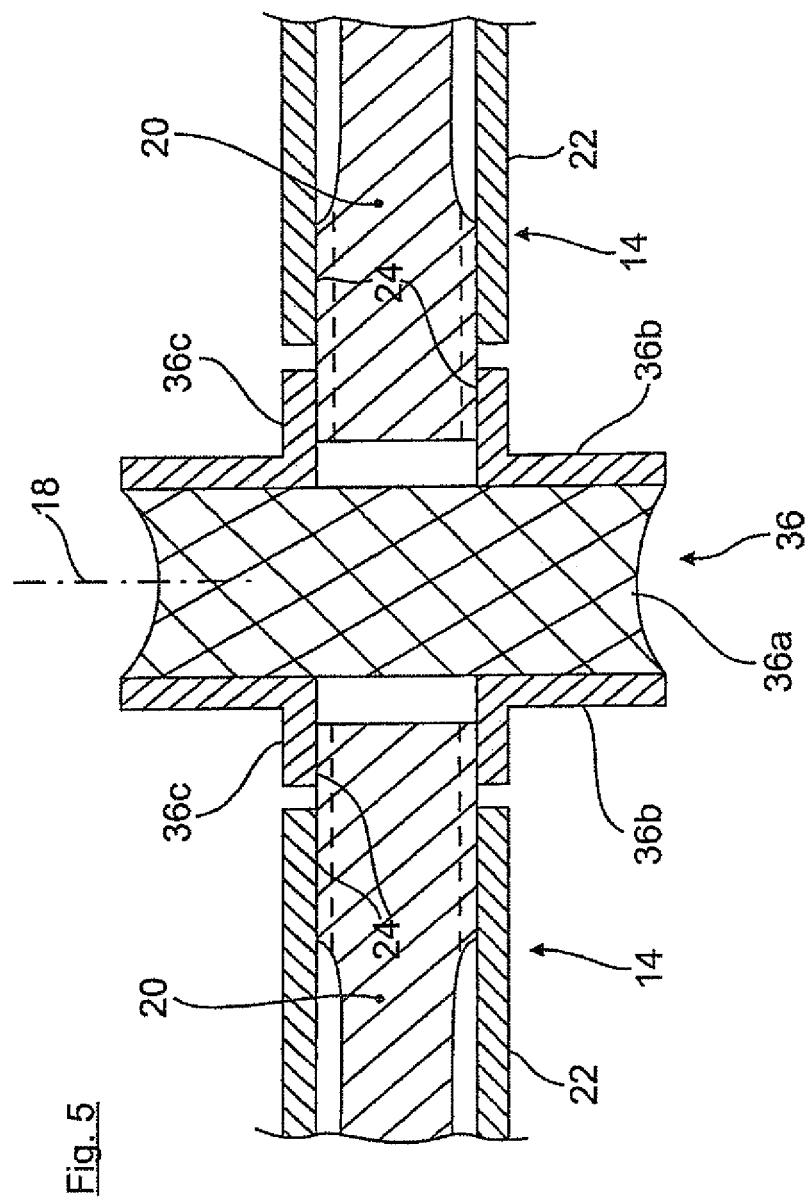

(51) Int. Cl.
*B60G 11/60* (2006.01)
*B60G 21/055* (2006.01)
*B60G 21/06* (2006.01)

(52) U.S. Cl.
CPC ......... *B60G 21/0555* (2013.01); *B60G 21/06* (2013.01); *B60G 2202/134* (2013.01); *B60G 2202/32* (2013.01); *B60G 2202/41* (2013.01); *B60G 2202/42* (2013.01); *B60G 2204/122* (2013.01); *B60G 2204/125* (2013.01); *B60G 2204/82* (2013.01); *B60G 2204/8302* (2013.01); *B60G 2206/427* (2013.01); *B60G 2206/73* (2013.01)

(58) Field of Classification Search
CPC ........ B60G 21/0555; B60G 2202/1351; B60G 2202/14; B60G 2202/142; B60G 2202/1424; B60G 2202/42; B60G 2204/122; B60G 2204/1222; B60G 2204/125; B60G 2204/82; B60G 2204/8302; B60G 2206/427; B60G 2206/73
See application file for complete search history.

(56) References Cited

U.S. PATENT DOCUMENTS

| | | | | |
|---|---|---|---|---|
| 3,778,082 A | * | 12/1973 | Grosseau | B60G 11/60 267/273 |
| 4,234,205 A | * | 11/1980 | Thiesce | B60G 11/183 280/124.107 |
| 4,491,342 A | * | 1/1985 | Aubry | B60G 3/145 267/154 |
| 6,951,341 B1 | * | 10/2005 | Beetz | B60G 21/0553 280/124.106 |
| 9,108,482 B2 | * | 8/2015 | Mohrlock | B60G 17/02 |
| 2001/0017437 A1 | * | 8/2001 | de Fontenay | B60G 11/23 267/279 |
| 2002/0149146 A1 | * | 10/2002 | Lefebvre | B60G 7/02 267/293 |
| 2003/0071516 A1 | * | 4/2003 | Biard | B60G 11/60 301/127 |
| 2003/0141757 A1 | * | 7/2003 | Deletombe | B60G 11/60 301/127 |
| 2004/0102567 A1 | * | 5/2004 | Pennequin | B60G 11/60 524/502 |
| 2004/0134059 A1 | * | 7/2004 | Berthellemey | B60G 11/24 29/525.01 |
| 2008/0042377 A1 | * | 2/2008 | Beetz | B60G 21/0555 280/5.511 |
| 2012/0299265 A1 | * | 11/2012 | King | B60G 3/20 280/124.136 |
| 2013/0127131 A1 | * | 5/2013 | Michel | B60G 11/183 280/124.106 |
| 2014/0046502 A1 | | 2/2014 | Schmitt et al. | |
| 2014/0232083 A1 | | 8/2014 | Schmitt et al. | |
| 2014/0319787 A1 | | 10/2014 | Schmitt et al. | |

FOREIGN PATENT DOCUMENTS

| | | |
|---|---|---|
| DE | 10 2006 009 524 | 9/2007 |
| DE | 10 2007 028 852 | 12/2008 |
| DE | 10 2009 005 899 | 7/2010 |
| DE | 10 2009 052 877 | 5/2011 |
| EP | 2070743 | 6/2009 |
| FR | 2318755 | 7/1975 |
| FR | 2874860 | 3/2006 |
| JP | 2010214980 | 9/2010 |
| JP | DE 10 2012 207 052 | 8/2013 |

* cited by examiner

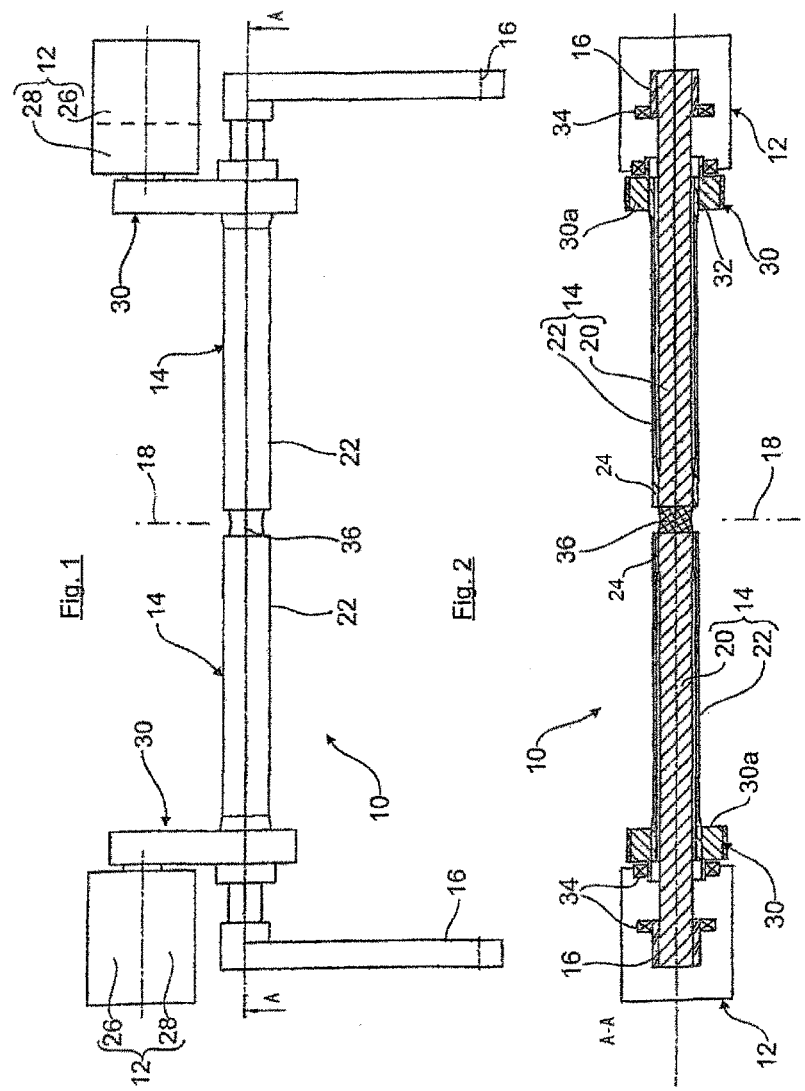

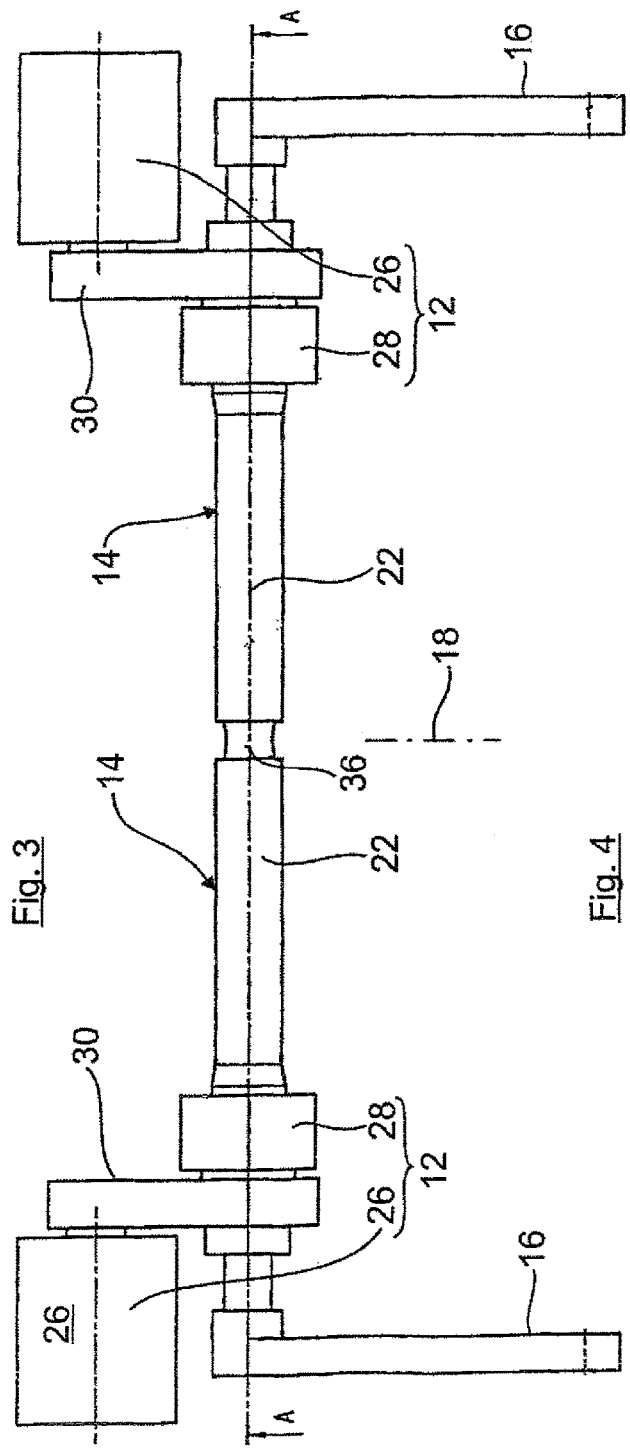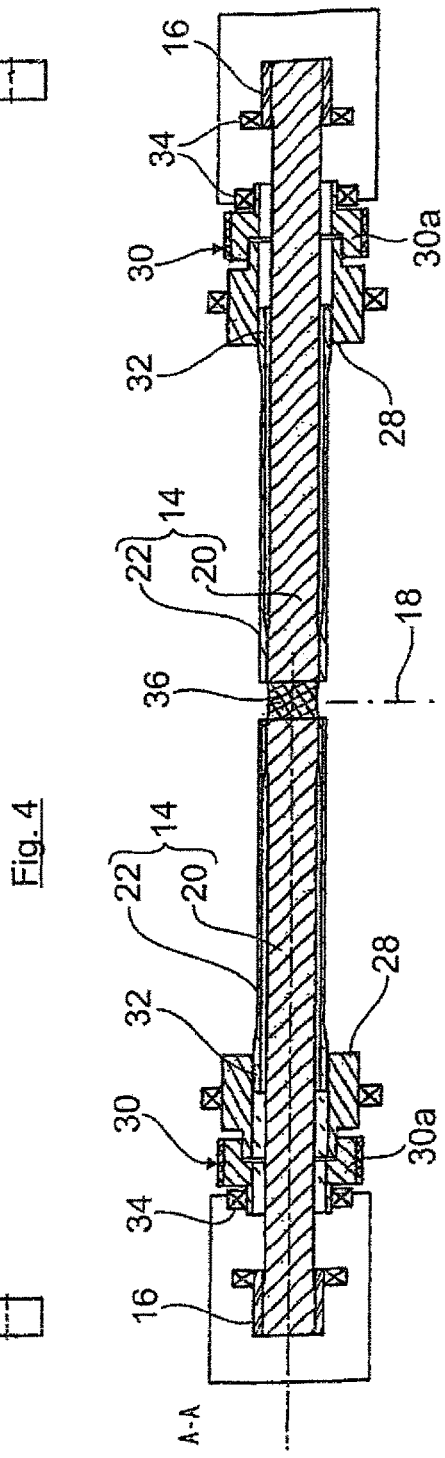

TORSION SPRING BAR SYSTEM FOR A WHEEL SUSPENSION OF A MOTOR VEHICLE

The present invention relates to a torsion spring bar system for a wheel suspension of a motor vehicle according to the preamble of patent claim 1.

A torsion spring bar system of the generic type is described, for example in DE 10 2009 005 899 A1, in which a torsion spring bar that is maintained under variable tension via a motor-gear unit or an actuator acts on each vehicle side via an output lever upon a wheel suspension element of the two-sided wheel suspensions of motor vehicles. The torsion spring bar system forms an active rotary actuator or stabilizer which acts as a storage spring at the same time to enable a level adjustment of the body of the motor vehicle and also to counteract tendencies to roll and pitch. The torsion spring bar is configured of at least two parts for space reasons, with a transverse, central solid bar and an outer tubular bar, which are connected in series to obtain the required spring characteristics, with the solid bar extending in the backward direction through the actuator that is configured as a hollow shaft.

Object of the invention is to provide a torsion spring bar system of the generic type with still further improved spring characteristics, particularly in the presence of driving-dynamic loads, with little additional effort.

The object is achieved by the features of patent claim 1. Advantageous and particularly suitable refinements of the invention are subject matter of subclaims.

According to the invention, it is proposed that the two ends of the torsion spring in substantial axially adjacent relationship in the vehicle longitudinal center are coupled to one another via at least one additional torsion spring element. Surprisingly, this configuration succeeds to realize an improved load distribution in the actuators, despite the typical, separate control of the torsion spring bar system, particularly in the presence of dynamically occurring peak loads in the wheel suspensions, so that stress on the components is more uniform and an improved decrease of excess loads is effected.

Particularly preferred is to provide the torsion spring element with a characteristic which is progressive over the spring travel. As a result, the actuators are substantially decoupled in the presence of smaller, changing road excitations. When greater torsion angles are involved, the torsion spring rate increases. For example, when balancing great roll angles and in the presence of simultaneous excitation by an impact, the encountered peak load can be transmitted via the torsion spring element to the other actuator. Peak loads, which have to be taken into account when dimensioning the component, are smaller. The components can therefore be constructed more lightweight and more cost-effective while at the same time increasing protection against component failure.

The torsion spring element can be further formed by an elastomer body which is connected indirectly or directly to the terminal ends of the torsion spring bars and preferably has rotation-symmetric outer circumference.

The torsion spring element can be formed, particularly preferred, from an elastomer body which is vulcanized in place between two bearing plates of greater diameter, with catches being provided on the bearing plates and cooperating with the plug toothing of the torsion spring bars. This results in a robust and easy-to-install construction of the torsion spring element, which may, optionally, also have integrated therein end stops acting in the circumferential direction. The catches may, preferably, be internally toothed bearing sleeves, which cooperate with the plug toothing of the solid bar of the torsion spring bars. With this plug toothing, the solid bar can thus be coupled to both the tubular bar and the torsion spring element configured as mounting unit.

According to a particularly advantageous configuration of the invention, especially with respect to the arrangement in the motor vehicle, the electric motor of the actuator can be arranged in axis-parallel relationship to the torsion spring bar and is in driving relation to the tubular bar via a flexible drive with an output gear constructed as hollow shaft. This can be implemented either in direct drive or via a gearing with high gear ratio to reduce stress on the wrap-around member, for example a chain or a toothed belt, with the flexible drive being in driving relation to the gearing, which is arranged coaxially to the tubular bar and constructed of hollow shaft design and which is in driving relation to the tubular bar.

As an alternative, the actuators with the electric motor and the gearing may be constructed in a manner known per se in hollow shaft design and be in driving relation to the tubular bar in coaxial relationship to the torsion spring bar.

Several exemplary embodiments of the invention become readily apparent hereinafter with reference to the accompanying schematic drawing. It is shown in:

FIG. 1 a plan view of a torsion spring bar system for a left-hand and right-hand wheel suspension of a motor vehicle, each with a torsion spring bar which is oriented transversely in the motor vehicle and which is adjustable via an actuator and a flexible drive and acts on an output lever;

FIG. 2 a longitudinal section along the section plane A-A of FIG. 1 through the torsion spring bar system;

FIG. 3 a view analogous to FIG. 1 upon a torsion spring bar system with actuators, respective flexible drives, and respective gearings arranged coaxially to the torsion spring bars;

FIG. 4 a longitudinal section along the section plane B-B in FIG. 3 through the torsion spring bar system; and FIG. 5 a view of an additional torsion spring element with plug toothing to couple the two torsion spring bars via the torsion spring element.

FIGS. 1 and 2 show a torsion spring bar system 10 comprised of two torsion spring bars 14 which are each adjustable by an actuator 12. The left half and the right half of the torsion spring bar system 10 are identical and mirror images of one another and their components, as far as visible, are provided with same reference numerals.

Each of the torsion spring bars 14 (FIG. 2) extends in the vehicle transverse direction y from an external output lever 16 to just shy of the vertical vehicle center plane 18 and is comprised of a solid bar 20 and a coaxially arranged tubular bar 22, which are connected to one another by interference fit via a plug toothing 24 which is oriented substantially in the vehicle center 18.

Each outwardly positioned output lever 16 is pivotally connected to a wheel guide element (not shown) of the left-hand and right-hand wheel suspension of the motor vehicle. The wheel guide element may, for example, be a control arm or a wheel carrier, to which the output lever 16 is articulated with interposition of a coupling rod.

The actuator 12 secured to the vehicle body or a subframe includes an electric motor 26 arranged in axis-parallel relation to the torsion spring 14, a gearing 28 with high gear ratio (for example harmonic drive gear), and a flexible drive 30 which is in driving relation to the tubular bar 22, that is at its end opposite to the plug toothing 24.

The flexible drive 30, preferably a toothed belt drive, is in driving relation to a pulley 30a (FIG. 2), which is held formfittingly on the tubular bar 22 via a further plug toothing 32 in circumferential direction.

The tubular bar 22 and the solid bar 20 routed there through are rotatably mounted in a vehicle-fixed housing (not shown) via only indicated bearings 34 (roller or slide bearings) in the area of the output lever 16 and the flexible drive 30; the housing can form for example a unitary structure with the actuator 12.

As shown in particular in FIG. 2, the solid bars 20 (this may, however, also be the tubular bars 22) are coupled to one another via a torsion spring element 36 at their ends lying in the vehicle center 18, so that adjustment forces activated, for example, via the left actuator 12 are transmitted from the left torsion spring bar 14 to the right torsion spring bar 14, or vice versa spring forces originating from the output lever 16 act on the right torsion spring bar 14.

The torsion spring element 36 is, preferably, formed by an elastomer body with rotation-symmetric outer circumference and constructively designed such as to have a progressively increasing spring rate. This can, for example, be realized by not shown recesses and webs in the elastomer body, which transitions at initially low spring rate and flat force and torsion angle characteristic line to a characteristic line with significantly ascending gradient.

FIG. 5 shows a preferred exemplary embodiment of the torsion spring element 36 which is comprised essentially of a rotation-symmetric elastomer body 36a and two bearing plates 36b which enclose the latter and are firmly connected to one another by vulcanization, for example.

Secured to the bearing plates 36b are bearing sleeves 36c which serve as catches and have a plug toothing 24 that is compatible with the solid bars 20 of the torsion spring bars 14 and which are formfittingly plugged in the circumferential direction upon a portion of the solid bars 20 that extends beyond the tubular bars 22.

Via the torsion spring element 36 of FIG. 5, which has a diameter that is greater, for example, by the factor 3, spring forces can be transmitted in the described, progressively increasing spring rate. Furthermore, the torsion spring element 36 can easily be attached to the torsion spring bars 14 or integrated into the torsion spring bar system 10.

Optionally, stops may be provided on the bearing plates 36b and act in circumferential direction to form a defined limitation of the torsion angle for the torsion spring element 36 or the elastomer body 36a.

FIGS. 3 and 4 show an alternative exemplary embodiment of the torsion spring bar system 10, which is described only insofar as it differs from the embodiment of FIGS. 1 and 2. Functionally identical parts are designated with same reference numerals.

As an alternative to the preceding configuration, the gearing 28 with high gear ratio is configured in hollow shaft design and positioned, like the pulley 30a of the flexible drive 30, also about the tubular bar 22.

As a result, the electric motor 26 is in driving relation via the toothed belt of the flexible drive 30 with the pulley 30a which in turn is in driving relation to the axially adjacent gearing 28, whose output element then correspondingly actuates the tubular bar 22 via the plug toothing 32. The gearing 28 may, for example, be a harmonic gear drive or a cycloidal gear drive of known design.

According to a further variant of the torsion spring bar system 10 (not shown), the electric motor 26 may also be disposed in hollow shaft design about the tubular bar 22, wherein in this case the flexible drive 30 is eliminated and the hollow output shaft of the electric motor 26 would act on the gearing 28.

The invention is not limited to the exemplary embodiments described. The torsion spring bars 14 may also be formed from two tubular bars 22, connected in series, and a solid bar 20 of spring steel, with the torsion spring element 36 coupling both torsion spring bars 14 accordingly. Optionally, the torsion spring element 36 may also be formed by a spring element having a same function and provided with helical compression springs oriented in circumferential direction, similar to a clutch driving disk in motor vehicles.

What is claimed is:

1. A torsion spring bar system for a wheel suspension of a motor vehicle, comprising:
    torsion spring bars oriented transversely to a vehicle longitudinal center on both vehicles sides, respectively, each of said torsion spring bars acting on a wheel guide element of the wheel suspension with variable pretension via an output lever positioned outwards with respect to the vehicle longitudinal center;
    an actuator configured to act on the torsion spring bar with a torsional moment;
    at least one torsion spring element configured to couple the torsion spring bars to one another at axially adjacent ends in the vehicle longitudinal center; and
    a flexible drive having an output gear in hollow shaft design, each of said torsion spring bars including a solid bar and a tubular bar connected to the solid bar, said actuator including an electric motor and a gearing with a high gear ratio to reduce stress on the flexible drive, said flexible drive being a chain or a toothed belt, and said electric motor being arranged in axis-parallel relation to the torsion spring bar and in driving relation to the tubular bar via the flexible drive with the output gear.

2. The torsion spring bar system of claim 1, wherein the at least one torsion spring element has a progressive characteristic with a torsional moment increasingly acting on the torsion spring element.

3. The torsion spring bar system of claim 1, wherein the at least one torsion spring element has an elastomer body which is connected with the adjacent ends of the torsion spring bars, said elastomer body having a rotation-symmetric outer circumference.

4. The torsion spring bar system of claim 1, wherein the flexible drive is in driving relation to the gearing which is configured in coaxial relation to the torsion spring bars and configured in hollow shaft design and which is in driving relation to the torsion spring bars.

5. The torsion spring bar system of claim 1, wherein the electric motor and the gearing of the actuator are configured in hollow shaft design and in coaxial driving relation to the torsion spring bars.

6. The torsion spring bar system of claim 1, wherein each of said torsion spring bars is made of the at least of two parts, one of the parts being a tubular bar extending towards the vehicle longitudinally center, and the other part being a radially inner solid bar, said solid bar being attached to the actuator and extending in backwards direction through the tubular bar for indirect or direct connection to the output lever.

7. The torsion spring bar system of claim 1, wherein the at least one torsion spring element includes two bearing plates, and an elastomer body which is vulcanized in place between the two bearing plates, said two bearing plates having catches which interact with a plug toothing of the torsion spring bars.

8. The torsion spring bar system of claim 7, wherein the catches are constructed in the form of internally toothed bearing sleeves which interact with the plug toothings of the torsion spring bars, respectively.

* * * * *

UNITED STATES PATENT AND TRADEMARK OFFICE
CERTIFICATE OF CORRECTION

| | | |
|---|---|---|
| PATENT NO. | : 9,694,645 B2 | Page 1 of 1 |
| APPLICATION NO. | : 14/908933 | |
| DATED | : July 4, 2017 | |
| INVENTOR(S) | : Joachim Schmitt | |

It is certified that error appears in the above-identified patent and that said Letters Patent is hereby corrected as shown below:

On the Title Page

On page 2, Column 4, under FOREIGN PATENT DOCUMENTS, correct "JP DE 10 2012 207 052" to read --DE DE 10 2012 207 052--.

In the Claims

Column 4, Claim 6, Line 2: please delete "of the", and in Line 4, please correct "longitudinally" to read --longitudinal--.

Signed and Sealed this
Third Day of October, 2017

Joseph Matal
*Performing the Functions and Duties of the*
*Under Secretary of Commerce for Intellectual Property and*
*Director of the United States Patent and Trademark Office*